United States Patent
Makowitz et al.

(10) Patent No.: US 10,121,373 B2
(45) Date of Patent: Nov. 6, 2018

(54) METHOD AND APPARATUS FOR REPORTING TRAFFIC INFORMATION

(71) Applicants: Rainer Makowitz, Munich (DE); Frodo Ferro, Toulouse (FR); Xavier Hours, Tournefeuille (FR); Christophe Oger, Toulouse (FR)

(72) Inventors: Rainer Makowitz, Munich (DE); Frodo Ferro, Toulouse (FR); Xavier Hours, Tournefeuille (FR); Christophe Oger, Toulouse (FR)

(73) Assignee: NXP USA, Inc., Austin, TX (US)

( * ) Notice: Subject to any disclaimer, the term of this patent is extended or adjusted under 35 U.S.C. 154(b) by 316 days.

(21) Appl. No.: 14/434,906

(22) PCT Filed: Oct. 15, 2012

(86) PCT No.: PCT/IB2012/002336
§ 371 (c)(1),
(2) Date: Apr. 10, 2015

(87) PCT Pub. No.: WO2014/060786
PCT Pub. Date: Apr. 24, 2014

(65) Prior Publication Data
US 2015/0269841 A1    Sep. 24, 2015

(51) Int. Cl.
*H04N 7/18*         (2006.01)
*G08G 1/0967*       (2006.01)
*G06K 9/00*         (2006.01)

(52) U.S. Cl.
CPC ... *G08G 1/096791* (2013.01); *G06K 9/00825* (2013.01); *H04N 7/181* (2013.01)

(58) Field of Classification Search
CPC .................................................. G08G 1/096791
(Continued)

(56) References Cited

U.S. PATENT DOCUMENTS

2004/0198339 A1    10/2004  Martin
2006/0074546 A1*    4/2006  DeKock .................. G08G 1/01
                                                    701/117
(Continued)

FOREIGN PATENT DOCUMENTS

EP         1566665 A1     8/2005

OTHER PUBLICATIONS

International Search Report and Written Opinion correlating to PCT/IB2012/002336 dated Jul. 25, 2013.
(Continued)

*Primary Examiner* — Leron Beck

(57) ABSTRACT

An apparatus for reporting traffic information comprises a mobile device. The mobile device comprises one or more sensor for monitoring an environmental condition, a memory for storing one or more template. A signal processing module is present for comparing the monitored environmental condition with a selected one of the one or more template indicative of a type of environmental condition. The module generates a event notification message when the monitored environmental condition matches the selected template, the event notification message including information of the type of environmental condition. A transmitter is arranged to transmit the event notification message to a remote station.

16 Claims, 2 Drawing Sheets

(58) Field of Classification Search
USPC .......................................................... 348/148
See application file for complete search history.

(56) References Cited

U.S. PATENT DOCUMENTS

| | | | |
|---|---|---|---|
| 2007/0088490 A1* | 4/2007 | Sutardja | G01S 19/14 |
| | | | 701/117 |
| 2007/0159355 A1* | 7/2007 | Kelly | G08G 1/096716 |
| | | | 340/905 |
| 2007/0213922 A1 | 9/2007 | Van Buer et al. | |
| 2008/0010003 A1* | 1/2008 | Hegedus | G08G 1/0104 |
| | | | 701/118 |
| 2012/0092187 A1 | 4/2012 | Scholl et al. | |
| 2012/0123667 A1* | 5/2012 | Gueziec | G08G 1/0112 |
| | | | 701/119 |
| 2012/0130625 A1 | 5/2012 | Srivastava | |
| 2012/0296559 A1 | 11/2012 | Gueziec et al. | |
| 2013/0049987 A1* | 2/2013 | Velusamy | G08G 1/0112 |
| | | | 340/905 |

OTHER PUBLICATIONS

VDI Kurzstudie: Thomas Werner, Dr. Norbert Malanowski:Crowdsourcing, Internet, ITA-Kurzstudie Jul. 2011, web page: www.beatthetraffic.com, smartphone app to use GPS location for Traffic info.

* cited by examiner

METHOD AND APPARATUS FOR REPORTING TRAFFIC INFORMATION

FIELD OF THE INVENTION

This invention relates to a method and apparatus for reporting traffic information which may be used for the purposes of traffic management and is particularly applicable to crowd sourcing techniques.

BACKGROUND OF THE INVENTION

Traffic information is useful for route planning by individuals and for development planning by local governments. Traditional methods of monitoring traffic flow include, for example, the use of video cameras installed on roads.

More recent methods such as those described in United States patent application publication 2012/013 0625 and European patent application publication EP 1566665 A1, rely on the use of mobile phones, in-car global positioning systems (GPS) and crowd sourcing techniques. Crowd sourcing techniques involve utilising a large group of people to provide traffic information.

For example, individuals driving on a particular road may place a cellular phone call or send a SMS (short message service) regarding their location and speed to a remote station that processes such information. In order to prompt the driver of a car to send a message reporting location and speed, the remote station may send out a request to a particular mobile phone for such information. Such a method has the disadvantage that it may constitute a distraction to the driver.

Other known crowd sourcing techniques use software on a mobile phone to transmit data at regular intervals but the information transmitted is limited in its content.

SUMMARY OF THE INVENTION

The present invention provides a method and apparatus for traffic management as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary for the understanding and appreciation of the underlying concepts of the present invention and in order not to obfuscate or distract from the teachings of the present invention.

Figure 1:
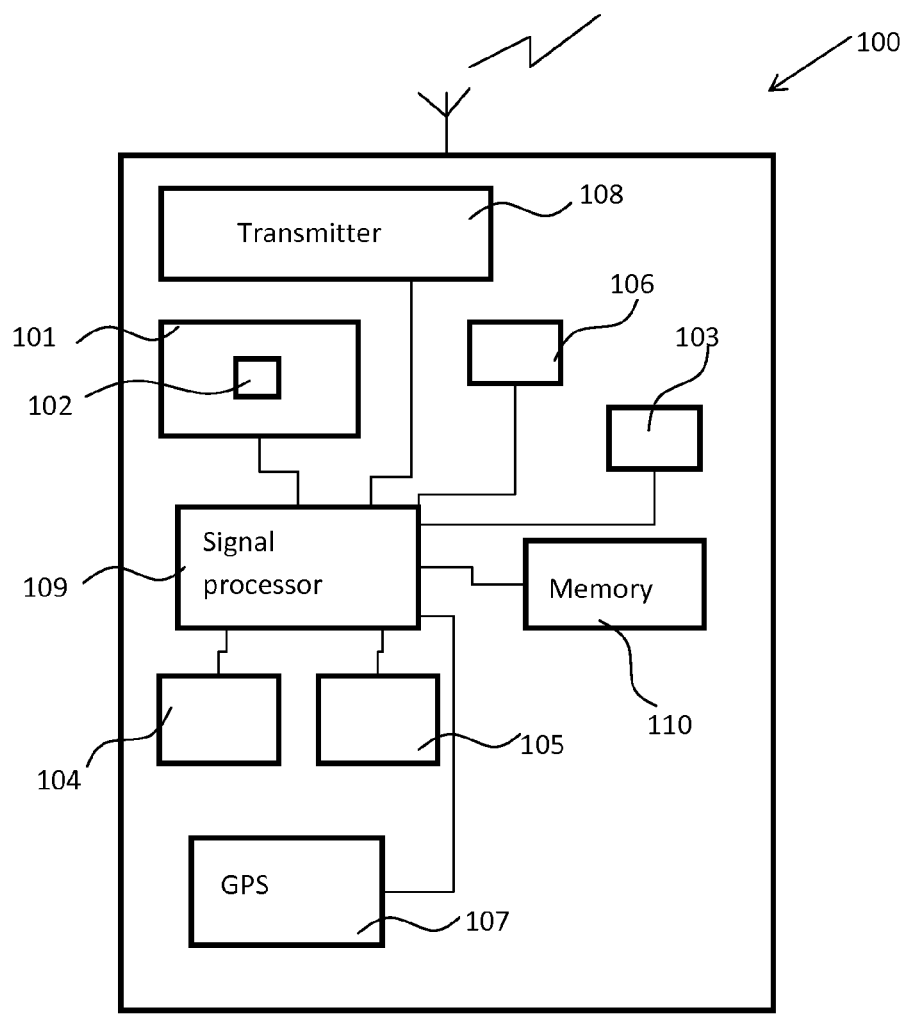
FIG. 1 shows a simplified block diagram of an example of an apparatus for gathering and transmitting traffic information.

With reference now to FIG. 1, a mobile device may comprise a portable wireless communication device, such as the mobile phone 100 shown, which can communicate over a wireless connection with a telecommunications network, such as with a base station of a cellular network. The mobile phone 100, in this example, is arranged to gather and report traffic information and so is intended to be placed in a travelling vehicle (not shown). The mobile phone 100 may be provided with at least one sensor for monitoring an environmental condition. An environmental condition may, for example, comprises at least one from a list including; ambient light level, ambient sound sources, proximity of visually detectable objects, vertical acceleration, lateral acceleration, rotational acceleration. The sensor may e.g. be a camera, a microphone, an acceleration sensor, gyroscope or other sensor build-in the mobile phone that enables sensing an physical parameter providing information about one or more environmental conditions.

The mobile phone 100 may for example be provided with a plurality of sensors as follows. The mobile phone 100 may include a camera 101 and camera lens 102 for monitoring the proximity of visually-detectable objects. The mobile phone 100 may be placed in a cradle (not shown) which, in turn, is secured to the vehicle, e.g. mounted on the dashboard. The cradle may be located in the vehicle in a position so that the camera lens 102 can capture a scene external to the vehicle. The mobile phone 100 may be positioned so that the camera lens 102 may view a scene as viewed by the driver of the vehicle. The cradle may provide charging current to the mobile phone from the vehicle's electrical system (not shown). The mobile phone 100 may be provided with an ambient light level sensor 103. The mobile phone 100 may be provided with a microphone 104 for monitoring ambient sound sources. The mobile phone 100 may be provided with an accelerometer 105 for monitoring vertical and/or horizontal accelerations. The accelerometer 105 may also be capable of measuring rotational acceleration about one, two or three axes and may include a three-axis gyroscope, for example. The mobile phone 100 may be provided with a proximity sensor 106. The proximity sensor 106 may be arranged to detect when the mobile phone 100 is close to the face of a user while the user is making a telephone call, for example. The proximity sensor 106 may be a capacitive proximity sensor, for example.

The mobile phone may be provided with a global positioning system GPS module 107 which may have the capability of computing the location of the mobile phone, in terms of a latitude and longitudinal for example. The GPS module 103 may also have the capability to compute the speed of travel of the mobile phone, record the time of day and monitor a compass heading of the vehicle. A digital compass (not shown) may be included either in the GPS module 103 or as separate modules in the mobile phone 100. Additionally or alternatively, the vehicle may be equipped with an on-board GPS and information from this vehicle-mounted on-board GPS may be transmitted to the mobile phone 100. This information may be transmitted via the cradle.

The mobile phone 100 may also be provided with a transmitter module 108 for enabling communication with a remote station (such as described with reference to FIG. 2) via a wireless connection (not shown).

A signal processing module 109 may be included in the mobile phone 100, as may be a memory 110 coupled to the signal processing module 109. An output from each of the sensors 101, 103, 104, 105, 106, and the GPS module 107, may be connected to the signal processing module 109. The signal processing module 109 may also be operably coupled with the transmitter module 108. The memory 110 may contain one or more templates as described in greater detail below. The template may combine different sensors and for example be combining images and sound. The signal processing module 109 may, for instance, be arranged to receive a signal from at least one of the sensors 102, 103-106, and compare the signal with a template signal indicative of a type of environmental condition. For example, as an intermediate operation the signal processing module may for example from the signal a monitored environmental condition or physical parameters (e.g. motion profile) and then compare those with a template indicative for a type of environmental condition. The templates may for example be stored as characteristics of sensor signals observed in specific environmental conditions, as characteristics of physical parameters sensed by the sensors (e.g. speed, acceleration) observed in specific environmental conditions or other suitable template.

For instance, while the mobile phone 100 is located in a cradle in a moving vehicle, the signal processing module 109 may gather information from all the sensors in the mobile phone relating to ambient light level, ambient sound sources, images of the surrounding scene, acceleration and also gathers information from the GPS module 107 relating to location, speed, time, and heading. The memory 110 has stored therein, templates which may relate to environmental conditions which could be of interest to traffic management systems. For instance, the presence of an emergency vehicle at a particular location could be of use in traffic management and traffic flow planning. As another example, the existence of a poor road surface on a particular stretch of road could also be of interest to traffic planning organisations.

For example, the signal processing module may determine from images from a camera the presence of another vehicle near the vehicle. The memory 110 may have stored therein a template which consists of an image of an emergency vehicle (such as an ambulance or police vehicle which may have the words "ambulance" or "police" written on them as appropriate). The signal processing module 109 may select this particular template image and compare it with the image received from the camera 102. The signal processing module may compare the vehicle with a template for a specific type of vehicle (such as a police car, ambulance or otherwise) and generate an event notification message when the detected environmental condition matches the selected template, e.g. when the signal processing module detects a template word ("police") in the image from the camera. The memory 110 may also have stored therein a sound profile of an emergency vehicle siren which the signal processor module 109 may select and compare with a signal from the microphone 104. If a match is found between a signal from one or more sensors and the selected template, then the signal processor module 109 may generate an event notification message.

Also, the signal processing module may determine from e.g. speed and/or acceleration and/or rotation signals a motion profile, and e.g. compare that with a template motion profile of a vehicle in traffic jam e.g. low (for instance less than 50 km/h on a motorway) speed with frequent short accelerations and decelerations without significant rotation, or a template motion profile of a vehicle passing road works with lane closure (e.g. constant speed below the official speed limits, for instance 30 km/h below the official speed limit).

As a further example, the memory 110 may have stored therein a template which corresponds to a reduced ambient light level which signifies that the vehicle has entered a tunnel. The signal processing module 109 may be arranged to compare this template with a signal from the ambient light sensor. 103 An event notification message may be generated by the signal processing module 109 if a match is found.

Also, outputs from the accelerometer 105 may be used to detect a poor road surface. For example, vertical acceleration and/or lateral acceleration and/or roll and/or pitch and/or yaw may be monitored by the accelerometer 105. By selecting an appropriate template and comparing a signal received from the accelerometer 105, the signal processing module 109 may then generate an event notification message if a match is found Other environmental conditions which may result in generation of an event notification message on comparison with a selected template may, for example, be traffic camera flashes (e.g. determined from an ambient light sensor) and the presence of a traffic camera (e.g. determined from images from a camera).

It will be appreciated that the environmental conditions as discussed herein are by no means limited to the examples given above. Further, the mobile device is not limited to including those sensors given above as examples. The use of alternative or additional sensors which may provide useful environmental condition information are contemplated. Furthermore, a template may involve multiple sensors, for example a combination of sound, images or other suitable combination If the signal processing module generates an event notification message, the signal is sent to the transmitter module 108 which in turn, transmits the signal to a remote station (for example as described below with reference to FIG. 2). The event notification message may e.g. comprise a part describing the event that has occurred; eg. "emergency vehicle detected," "bad road surface detected", "traffic jam detected", "road works detected", "working speed camera detected", etc.

The event notification message may include any other additional information. For example, t the signal processing module 109 may also receive from the GPS module 107 information relating to the location, heading and speed of the mobile phone 100 (and vehicle in which it is located) and time information and may include all or some of this additional information in the event notification message for onward transmission to the remote station via the transmitter 108. In this way, the presence of an emergency vehicle can be linked to a specific location and a specific time, for example.

For instance, the signal processor 109 may tag a message comprising information relating to the identity of the mobile phone 100 to an event notification message for onward transmission to the remote station.

For instance, if the proximity sensor 106 detects that the mobile phone 100 is close to the face of a user, then the signal processor 109 may be arranged to tag an "alert" message to an event notification message for onward transmission to a remote station. Alternatively or additionally, if the proximity sensor 106 detects that the mobile phone 100 is close to the face of a user, then the signal processor 109 may be arranged to inhibit the generation or transmission of an event notification message (e.g. immediately or after the "alert" message is sent).

Figure 2:
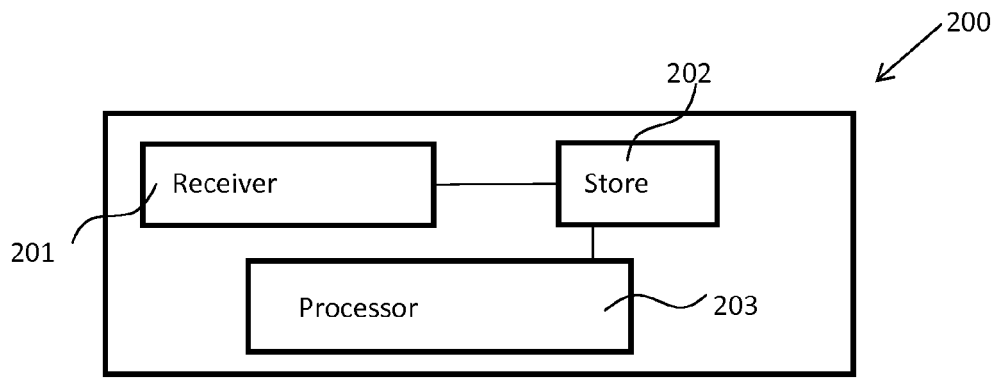
FIG. 2 shows a simplified block diagram of an example of an apparatus for receiving and processing traffic information.

Referring now to FIG. 2, a remote station 200 may be arranged to receive event notification messages transmitted from one or several mobile phones, e.g. as described with reference to FIG. 1. Signals sent from a mobile phone 100 may be sent directly over a wireless interface to the remote station 200 or may be transmitted wirelessly to an intermediate receiving station (not shown) and thence transferred over a landline to the remote station 200. The mobile phone 100, remote station 200 or intermediate station may be arranged to be compatible with any available radio access technology. Wireless telecommunication systems, such cellular system, are well known. An example of such systems are those compliant with the standards and technology known as the Universal Mobile Telecommunications System (UMTS™), developed by the 3$^{rd}$ Generation Partnership Project (3GPP™). The 3rd Generation Partnership Project has also proposed a Long Term Evolution (LTE) solution, namely, an Evolved Universal Mobile Telecommunication System Territorial Radio Access Network, (E-UTRAN), for a mobile access network, and a System Architecture Evolution (SAE) solution, namely, an Evolved Packet Core (EPC), for a mobile core network. The mobile phone 100 and remote station 200 may be configured to support communications over any of these exemplary networks. Further, the mobile phone 100 and remote station may be provided with "M2M" machine to machine Application Programming Interfaces in order to efficiently source the transmitted signals over standard communications links.

The receiver module 201 may also receive GPS-generated information included in an event notification message and transmitted by the mobile phone 100 The receiver module 201 may also receive a message comprising the mobile phone's 100 identity, tagged to an event notification message, and transmitted by the mobile phone 100.

The remote station 200 may also comprise storage 202 for storing the traffic information, location information and mobile phone identity contained in the transmitted event notification messages and received from a mobile phone 100. The remote station 200 may also comprise a processing module 203 which uses a conventional statistical model to validate the traffic information contained in the event notification messages sent by each, particular, identified mobile phone. A score may be kept for every mobile phone to weight its input as a function of its "credentials." Credentials have to be earned by providing useful information over time. Additional crowd sourcing techniques may be used in the processing module 203 for eliminating false alarms by using statistical algorithms. The processing module 203 may use the traffic information stored in the storage 203 to build credibility by analysing traffic information reported from numerous mobile phones.

For example, information received which reports capturing an image of an emergency vehicle may be corroborated by another message received from the same mobile phone reporting detection of an emergency vehicle siren. This may further be corroborated by the reception of similar messages from other mobile phones noted to be at a proximate location.

In a further exemplary embodiment, if the proximity sensor 106 detects that the mobile phone 100 is close to the face of a user, then the signal processor 109 in the mobile phone 100 may be arranged to tag an "alert" message to the event notification message which is transmitted to the remote station 200. The processor 203 in the remote station 200 may be arranged to use this alert signal to determine a credibility weighting for any traffic information received from this particular mobile phone. The determined credibility weighting may be used by the processor 203 in the traffic information validation process. If the mobile phone 100 has been removed from its cradle, the camera lens 102 will not necessarily be trained on the optimum view of the road ahead. Also, the accelerometer 105 will monitor movement of the user's hand in addition to vehicle movements. Hence, traffic information received from this particular mobile phone under these conditions will not be as reliable as when it is located in its cradle and may give rise to false alarms. Hence, when a user is holding the mobile phone, the traffic information may be assigned a lower credibility than when the mobile phone is in its cradle.

Alternatively, the signal processor 109 in the mobile phone 100 may be adapted to determine the credibility weighting in such cases where it is detected that the mobile phone is being held close to a user's face. Such a determined credibility weighting may then be tagged to the event notification message for onward transmission to the remote station 200 for use in the validation process. A credibility weighting may relate to any monitored environmental condition which has been matched to a selected template.

Figure 3:
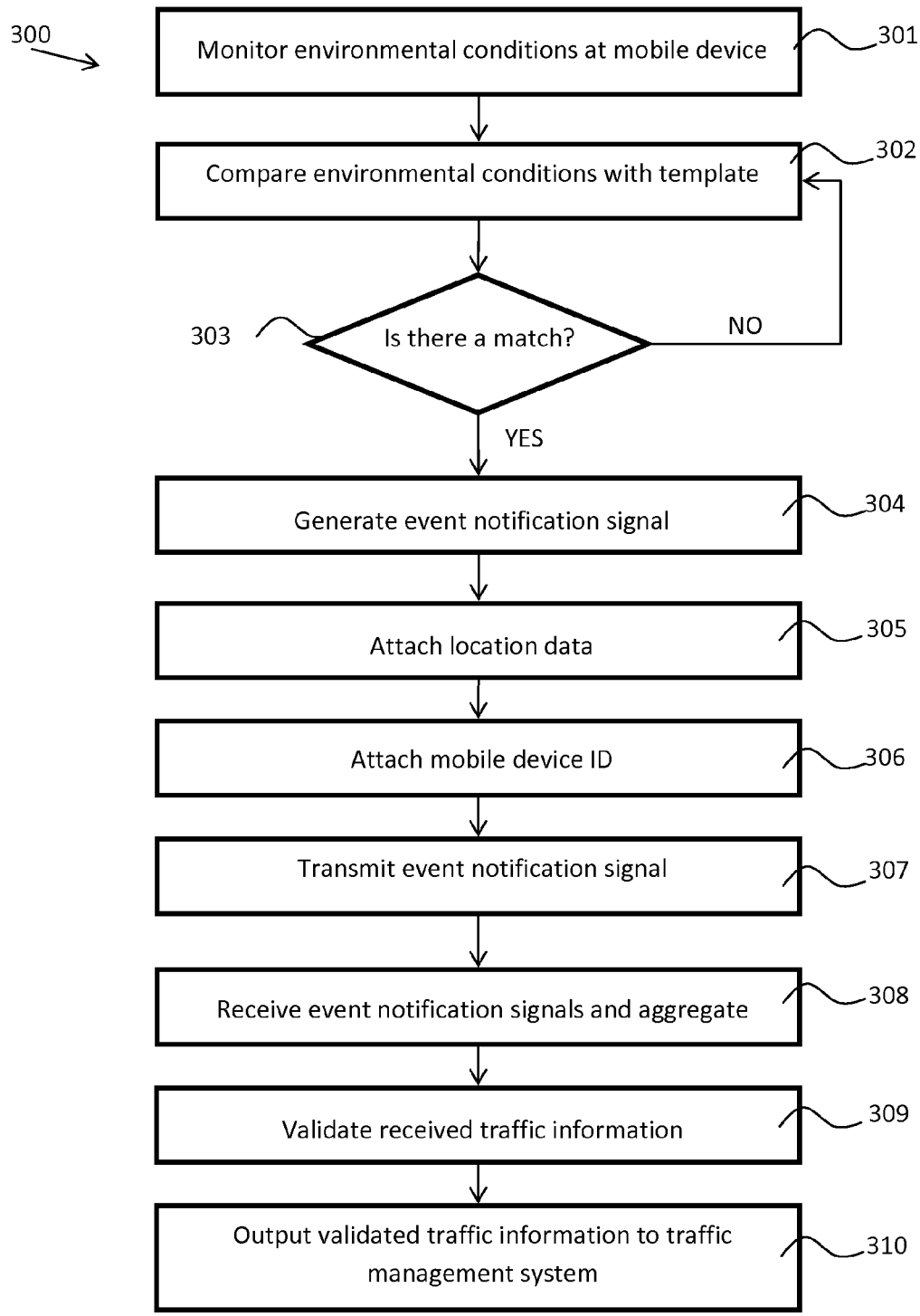
FIG. 3 shows a simplified flow chart of an exemplary method of reporting and processing traffic information.

Reference will now be made to FIG. 3 which shows a simplified flowchart of an exemplary method 300 of reporting and processing traffic information wherein a monitored environmental condition is compared with a template and an event notification message is transmitted from a mobile device to a remote station if the environmental condition matches the template. In FIG. 3, for convenience, separate blocks are shown, however it will be apparent that the operations of the different block may be performed at least partially overlapping, in time or otherwise.

As indicated with block 301, in a mobile device in a vehicle, at least one environmental condition is monitored by one of a plurality of sensors which are incorporated in the mobile device. An environmental condition may comprise, for example at least one from a list including; ambient light level, ambient sound sources, proximity of visually detectable objects, vertical acceleration, lateral acceleration.

As indicated with block 302, an environmental condition is compared with a template selected from a plurality of stored template held in a storage. For example, an image captured by a camera incorporated in the mobile device may be compared with a template image representing a road-side traffic (speed/safety) camera.

As indicated with block 303, if a match is not found, then the process reverts to 302.

If, however, a match is found between the template and the captured image, then the method progresses to 304 where an event notification message is generated. An event notification message comprises a traffic information message indicating, in this example, that a traffic camera has been detected.

As indicated with block 305, data relating to the location of the mobile device may be attached to the event notification message. This location data may be provided by a GPS incorporated in the mobile device and may take the form of a latitude and longitude. Time of day, compass heading and speed of the vehicle in which the mobile device is placed may also be attached to the event notification message and provided by a GPS.

As indicated with block 306, an ID (identification) of the mobile device may be attached to the event notification message.

As indicated with block 307, the mobile device transmits the event notification message over a wireless communication link.

As indicated with block 308, the event notification message is received at a remote station. The traffic information, location information and mobile device ID contained in the event notification message from many mobile devices may be aggregated and stored.

As indicated with block 309, received traffic information may be validated using a statistical model.

As indicated with block 310, validated traffic information may be output to a traffic management system.

The invention may also be implemented in a computer program for running on a computer system, at least including code portions for performing a method according to the invention when run on a programmable apparatus, such as a computer system or enabling a programmable apparatus to perform functions of a device or system according to the invention. For example, the functionality of the signal processing module 109 may be implemented in a computer program and run on a programmable apparatus, such as a mobile phone.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium, or transmitted to the computer system via a computer readable transmission medium. All or some of the computer program may be provided on computer readable media permanently, removably or remotely coupled to an information processing system. The computer readable media may be a tangible medium and include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

In the foregoing specification, the invention has been described with reference to specific examples of embodiments of the invention. It will, however, be evident that various modifications and changes may be made therein without departing from the broader spirit and scope of the invention as set forth in the appended claims. For example, the term "mobile device" as used herein is not limited to comprising the mobile phone of the exemplary embodiments. For example, it may comprise any portable wireless device such as a personal digital assistant, "tablet" personal computer, lap top, "smart phone."

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the signal processor 109 and memory 110, shown as separate modules in FIG. 1 may both be included in one module. Similarly, the processor 203 and storage 202 of FIG. 2 may be included in a single module.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the signal processor 109 and memory 110 of FIG. 1 may be implemented together in a single integrated circuit or separately as two integrated circuits. Alternatively, the examples may be implemented as any number of separate integrated circuits or separate devices interconnected with each other in a suitable manner. For example, the signal processor 109, memory 110 and transmitter 108 of FIG. 1 may all be incorporated in one integrated circuit.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an."

The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A method for reporting traffic information comprising:
monitoring an environmental condition by a mobile device in a vehicle using data from at least one sensor in the mobile device;
comparing the monitored environmental condition with a template using a signal processing module in the mobile device, wherein the template is in memory in the mobile device;
transmitting an event notification message from the mobile device to a remote station only when the environmental condition matches the template, wherein the event notification message indicates a match between the environmental condition and the template;
determining credibility of the monitored environmental condition which matches the template based on whether the mobile device is in a specified location in the vehicle.

2. The method of claim 1 wherein the environmental condition comprises at least one from a group consisting of; ambient light level, ambient sound sources, proximity of visually detectable objects, appearance of visually detectable objects, vertical acceleration, lateral acceleration, rotational acceleration, and proximity of a user.

3. The method of claim 1, comprising: at the mobile device, transmitting location information of said mobile device.

4. The method of preceding claim 1, comprising: at the remote station, aggregating event notification messages received from a plurality of mobile devices.

5. The method of claim 1, wherein the mobile device transmits a message comprising its identity.

6. The method of claim 5, comprising: at the remote station, running a statistical model to validate an event notification message received from an identified mobile device.

7. The method of claim 1, wherein the mobile device is a mobile phone.

8. The method of claim 1, wherein said monitoring comprises: sensing with the sensor of the mobile device an ambient physical parameter to obtain information about said environmental condition.

9. An apparatus for reporting traffic information from a mobile device, the mobile device comprising:
a memory for storing at least one template;
a sensor including one of a group consisting of a camera, a microphone, an accelerometer, and a gyroscope; and
a signal processing module configured to:
receive signals from the sensor in the apparatus;
monitor an environmental condition of a road where the apparatus is located using the signals from the sensor;
compare the monitored environmental condition with a selected one of said at least one template;
generate an event notification message when the detected environmental condition matches the selected template, wherein the event notification message includes a first part that indicates a type of the selected template and a second part that includes the detected environmental condition;
determine credibility of the monitored environmental condition which matches the selected template based on whether the mobile device is in a specified location in a vehicle; and
send an indicator of the credibility to a remote station.

10. The apparatus of claim 9 wherein the signal processing module and the memory are implemented in at least one integrated circuit.

11. An apparatus for reporting traffic information, comprising:
a mobile device, the mobile device comprising:
at least two sensors for monitoring environmental conditions,
a memory for storing at least one template,
a signal processing module configured to:
compare the monitored environmental conditions with a selected one of said at least one template, wherein the selected template is based on information for at least two different environment conditions, and
determine credibility of the monitored environmental condition which matches the selected template based on whether the mobile device is in a specified location in a vehicle;
generate an event notification message when the monitored environmental conditions match the selected template and the monitored environmental condition is determined to be credible, the event notification message including a first portion describing an event that occurred and a second portion including the monitored environmental conditions;
a transmitter arranged to transmit the event notification message to a remote station.

12. The apparatus of claim 11 wherein an environmental condition comprises at least one from a list including; ambient light level, ambient sound sources, proximity of visually detectable objects, vertical acceleration, lateral acceleration, rotational acceleration, proximity of a user.

13. The apparatus of either of claim 11 wherein the signal processing module is arranged to determine a credibility weighting of monitored environmental conditions which match a selected template based on whether the mobile device is in a specified location in the vehicle, and send an indicator of the credibility weighting to the remote station.

14. The apparatus of claim 11 wherein the mobile device comprises a mobile phone.

15. The method of claim 1, wherein the environmental condition includes data from a sensor in the mobile device, wherein the sensor is at least one of a group consisting of a camera, a microphone, an accelerometer, and a gyroscope.

16. The apparatus of claim 9 wherein an environmental condition comprises at least one from a group consisting of; ambient light level, ambient sound sources, proximity of visually detectable objects, vertical acceleration, lateral acceleration, rotational acceleration, and proximity of a user.

* * * * *